United States Patent
Arazaki

(10) Patent No.: US 7,289,144 B2
(45) Date of Patent: Oct. 30, 2007

(54) FLICKER DETECTION APPARATUS, A FLICKER CORRECTION APPARATUS, AN IMAGE-PICKUP APPARATUS, A FLICKER DETECTION PROGRAM AND A FLICKER CORRECTION PROGRAM

(75) Inventor: Shinichi Arazaki, Shimosuwa-machi (JP)

(73) Assignee: Seiko Epson Corporation (JP)

( * ) Notice: Subject to any disclaimer, the term of this patent is extended or adjusted under 35 U.S.C. 154(b) by 838 days.

(21) Appl. No.: 10/392,320

(22) Filed: Mar. 19, 2003

(65) Prior Publication Data

US 2004/0012692 A1    Jan. 22, 2004

(30) Foreign Application Priority Data

Mar. 25, 2002 (JP) ............................. 2002-084342
Jan. 23, 2003 (JP) ............................. 2003-014742

(51) Int. Cl.
*H04N 9/73* (2006.01)
(52) U.S. Cl. ..................... 348/228.1; 348/295
(58) Field of Classification Search ............ 348/226.1, 348/227.1, 228.1, 362–368, 296, 297
See application file for complete search history.

(56) References Cited

U.S. PATENT DOCUMENTS

| | | | |
|---|---|---|---|
| 4,774,588 A | | 9/1988 | Noda et al. |
| 5,960,153 A | | 9/1999 | Oster et al. |
| 6,271,884 B1 | * | 8/2001 | Chung et al. ............... 348/370 |
| 6,295,085 B1 | | 9/2001 | Munson et al. |
| 6,501,518 B2 | * | 12/2002 | Smith et al. .............. 348/425.3 |
| 6,519,002 B1 | * | 2/2003 | Tomaszewski ........... 348/226.1 |
| 6,710,818 B1 | * | 3/2004 | Kasahara et al. ........... 348/607 |
| 6,989,860 B2 | * | 1/2006 | Hofer et al. .............. 348/226.1 |
| 6,999,118 B2 | * | 2/2006 | Suzuki ..................... 348/226.1 |
| 7,034,870 B2 | * | 4/2006 | Nagaoka et al. .......... 348/228.1 |
| 2002/0158971 A1 | * | 10/2002 | Daiku et al. .............. 348/226.1 |
| 2003/0090587 A1 | * | 5/2003 | Hofer et al. ................ 348/349 |
| 2003/0112343 A1 | * | 6/2003 | Katoh et al. ............. 348/226.1 |
| 2004/0201729 A1 | * | 10/2004 | Poplin et al. ............. 348/226.1 |
| 2006/0158531 A1 | * | 7/2006 | Yanof ....................... 348/226.1 |

FOREIGN PATENT DOCUMENTS

| | | |
|---|---|---|
| JP | 4-318767 | 11/1992 |
| JP | 5-316430 | 11/1993 |
| JP | 06-205282 | 7/1994 |
| JP | 07-298129 | 11/1995 |
| JP | 7-298130 | 11/1995 |
| JP | 7-336586 | 12/1995 |
| JP | 8-139991 | 5/1996 |
| JP | 8-265652 | 10/1996 |
| JP | 9-168156 | 6/1997 |
| JP | 9-238280 | 9/1997 |
| JP | 9-284634 | 10/1997 |
| JP | 11-032238 | 2/1999 |
| JP | 2000-092377 | 3/2000 |
| JP | 2002-84466 | 3/2002 |
| JP | 2002-84467 | 3/2002 |

* cited by examiner

*Primary Examiner*—Vivek Srivastava
*Assistant Examiner*—Chriss S Yoder, III
(74) *Attorney, Agent, or Firm*—Harness, Dickey & Pierce, P.L.C.

(57) ABSTRACT

A flicker detection apparatus takes in a plurality of images having different shutter times from the image sensing element and judges whether flicker occurs or not based on a variation of flicker components extracted from these images so that the accuracy of flicker detection on picking up a normal image can be improved.

24 Claims, 13 Drawing Sheets

(a)

(b)

(a)

(b)

(a)

(b)

(a)

(b)

FLICKER DETECTION APPARATUS, A FLICKER CORRECTION APPARATUS, AN IMAGE-PICKUP APPARATUS, A FLICKER DETECTION PROGRAM AND A FLICKER CORRECTION PROGRAM

BACKGROUND OF THE INVENTION

1. Technical Field of the Invention

The present invention is related to a flicker detection apparatus, a flicker correction apparatus, an image-pickup apparatus, a flicker detection program and a flicker correction program. In particular, it can be applied preferably to an image-pickup apparatus which implements exposure control via a focal plane shutter system.

2. Background Technology and Problems to be Solved by the Invention

In a conventional image-pickup apparatus, an image is picked up by shutter operation for each line by using a device like a CMOS sensor and using an exposure method similar to a focal plane shutter system.

However, in an image-pickup apparatus using an exposure method similar to a focal plane shutter system, there is a problem that lateral stripes occur in an image depending on specific shutter time, when an image is picked up with a flicker light source. Namely, shutter timing is different for every line in an image-pickup apparatus using an exposure method similar to a focal plane shutter system. Further, in a flicker light source, brightness fluctuates by a specific period.

Hence, on the line where the shutter is released at the time of high brightness of a flicker light source, a lot of electric charge is accumulated so that the image pixel of the line has higher brightness. On the other hand, on the line where the shutter is released at the time of low brightness of a flicker light source, a low electric charge is accumulated so that the image pixel of the line has low brightness. As a result, in an image picked up under a flicker light source, brightness of each line fluctuates periodically so that lateral stripes occur in an image. Therefore, when a subject having uniform brightness is picked up under a flicker light source, the occurrence of flicker is easily detected by observing lateral stripes that appear in an image.

On the other hand, in the case of picking up an image of normal scenery under a flicker light source, it is difficult to determine a case when lateral stripes occur due to the affect of flicker, or a case when such stripes occur due to a difference of high brightness on the scenery itself, if lateral stripes which appear are observed. Hence, in the conventional method, it is difficult to detect the occurrence of flicker in a case when a subject such as scenery or a person is picked up normally.

Therefore, an object of the present invention is to provide a flicker detection apparatus, a flicker correction apparatus, an image-pickup apparatus, a flicker detection program and a flicker correction program that can improve the accuracy of detecting flicker at the time of picking up a subject normally.

SUMMARY OF THE INVENTION

In order to overcome the above-mentioned problem, a flicker detection apparatus comprises an image taking-in means for taking in images having different shutter times, and a flicker judging means for judging the occurrence of flicker based on the comparison result of the images having different shutter times.

Hence, it is possible to emphasize the variation of flicker components compared with the variation of brightness of a subject itself, at the time of varying shutter time. Thus, it is possible to extract flicker components effectively from an image where the light and shade of a subject coexist. Therefore, the occurrence of flicker can be detected with high accuracy, even if a subject is picked up normally. Thus, the quality of an image picked up under a flicker light source can be improved.

In the flicker detection apparatus, the shutter time may be the shortest of the time for no flicker to occur and the further shorter time compared with it. Hence, flicker components can be extracted with high accuracy while restraining the possibility that flicker components are buried within the drift of brightness of a subject itself, even if various subjects come to be picked-up images.

In addition, in the flicker detection apparatus, the shutter time may be the shortest of the time for no flicker to occur and ½ thereof. Hence, it is possible to emphasize the variation of flicker components while an amount of exposure is maintained at the time of shortening shutter time. Thus, flicker components can be extracted with high accuracy, even if various subjects come to be picked-up images.

The flicker detection apparatus may comprise a frequency analysis means for analyzing flicker components as frequency components corresponding to each image having a different shutter time, and wherein the occurrence of flicker is recognized at the time when the difference among the flicker components extracted from each image signal is more than a regulated value. Hence, it is possible to extract flicker components effectively from an image where the light and shade of a subject coexist. Thus, flicker components can be extracted with high accuracy, even if a subject is picked up normally.

In the flicker detection apparatus, the frequency analysis means may complete a discrete Fourier transformation on the first dimension based on the result of adding values of the pixels on each line. Hence, the value for the frequency analysis maintains an improvement of S/N ratio, and flicker components can be detected with high accuracy, even if shutter timing is different for every line.

The flicker correction apparatus may comprise an image taking-in means for taking in images having different shutter times, a flicker judging means for judging the occurrence of flicker based on the result of comparing images having different shutter times, and a shutter timing setting means for setting shutter timing to be an integral multiplication of a flicker period when the occurrence of flicker is detected.

Hence, even if an image picked up under a flicker light source by using an exposure method similar to a focal plane shutter system, the affect of flicker can be reduced by changing shutter timing. Thus, image quality can be improved.

Further, In the flicker correction apparatus, the shutter time may be composed of the shortest of the time for no flicker to occur and the further shorter time compared with it.

Hence, flicker components can be corrected by extracting them with high accuracy while restraining the possibility that the flicker components are buried within the drift of brightness of a subject itself, even if various subjects come to be picked-up images.

In the flicker correction apparatus, the shutter time may be composed of the shortest of the time for no flicker to occur and ½ thereof.

Hence, it is possible to emphasize the variation of flicker components while an amount of exposure at the time of shortening shutter time is maintained. Thus, flicker components can be corrected by extracting them with high accuracy, even if a subject is picked up normally.

The flicker correction apparatus may further comprise a frequency analysis means for analyzing flicker components as frequency component corresponding to each of images having different shutter time, and wherein the occurrence of flicker is recognized at the time when the difference among flicker components extracted from each image signal is more than a regulated value.

Hence, it is possible to extract flicker components effectively from an image where the light and shade of a subject coexist. Thus, flicker components can be corrected by extracting them with high accuracy, even if a normal subject is picked up.

In the flicker correction apparatus, the frequency analysis means may complete a discrete Fourier transformation on the first dimension based on the result of adding the values of pixels on each line.

Hence, the value for the frequency analysis maintains an improvement of S/N ratio, and flicker components can be detected with high accuracy, even if shutter timing is different for every line.

An image picking-up apparatus may comprise an image pick-up means for picking up an image by a shutter operation for each line, a shutter-time control means for controlling a shutter time of the image picking-up means, an image taking-in means for taking in images having the different shutter time, a flicker judging means for judging the occurrence of flicker based on the result of comparing images having different shutter times.

Hence, it is possible to extract flicker components even if a subject is picked up normally without using a special subject having an entire pure white surface. Thus, the quality of an image picked up under a flicker light source can be improved thereby, even if the shutter timing of each line of an image pick up means is different.

Further, an image picking-up apparatus may further comprise a shutter timing setting means for setting shutter timing to be an integral multiplication of a flickering period when the occurrence of flickering is detected.

Hence, it is possible to reduce the affect of flicker only by changing shutter timing, even in a case of different shutter timing for each line of the image picking-up apparatus.

The image picking-up apparatus, may further comprise an out-of-focused image picking-up means for controlling a lens position to obtain an out-of-focused image when an image taken in via the image taking-in means is picked up.

Hence, the affect of the light and shade of a subject at the time of detecting flicker components can be reduced. Thus, flicker components can be extracted with high accuracy, even if various subjects come to be picked-up images.

In the image picking-up apparatus, the shutter time may be the shortest of the time for no flicker to occur and the further shorter time compared with it.

Hence, it is possible that flicker components can be extracted with high accuracy while restraining the possibility that flicker components are buried within the drift of brightness of a subject itself and corrected without using a special subject having an entire pure white surface.

In the image picking-up apparatus, the shutter time may be the shortest of the time for no flicker to occur and ½ thereof.

Hence, it is possible to emphasize the variation of flicker components while an amount of exposure is maintained at the time of shortening shutter time. Thus, flicker components can be extracted with high accuracy, even if various subjects come to be picked-up images. The quality of a picked-up image can be improved.

In the image picking-up apparatus, the flicker judging means may further comprise a frequency analysis means for analyzing flicker components as a frequency component corresponding to each image having a different shutter time, and it is judged thereby that flicker occurs at the time when a difference among flicker components extracted from an image signal is more than a regulated value.

Hence, it is possible to extract flicker components effectively from an image where the light and shade of a subject coexist. Thus, the occurrence of flicker can be detected with high accuracy, even if a subject is picked up normally.

In the image picking-up apparatus, the frequency analysis means may complete a discrete Fourier transformation on the first dimension based on the result of adding the values of pixels on each line.

Hence, the value for the frequency analysis maintains an improvement of S/N ratio, and flicker components can be detected with high accuracy, even if shutter timing is different for every line.

In the flicker detection program, a step for taking in images having different shutter times, and a step for judging the occurrence of flicker based on the comparison result of the images having different shutter times, may be implemented by a computer.

Here, it is possible to emphasize the variation of flicker components compared with the variation of the brightness of an object itself. Thus, flicker components can be extracted effectively from an image where the light and shade of a subject coexist. Therefore, flicker components can be corrected with high accuracy, even if a subject is picked up normally. The quality of an image picked up under a flickering light source can be improved.

In the flicker detection program, the shutter time may be the shortest of the time for no flicker to occur and the further shorter time compared with it. Hence, it is possible that flicker components can be extracted with high accuracy while restraining the possibility that flicker components are buried within the drift of brightness of a subject itself when various subjects come to be picked up images.

In the flicker detection program, the shutter time may be the shortest of the time for no flicker to occur and ½ thereof. Hence, it is possible to emphasize the variation of flicker components while an amount of exposure at the time of shortening shutter time is maintained. Thus, flicker components can be extracted with high accuracy, even if various subjects come to be picked-up images.

In the flicker detection program, the step of flicker judging may further comprise a step for analyzing flicker components as a frequency component corresponding to each image having a different shutter time, and a step for judging that flicker occurs at the time when the difference among flicker components extracted from each image signal is more than a regulated value.

Hence, it is possible to extract flicker components effectively from an image where the light and shade of a subject coexist. Thus, flicker components can be detected with high accuracy, even if a subject is picked up normally.

In the flicker detection program, the step for frequency analysis may complete a discrete Fourier transformation of the first dimension based on the result of adding the values of pixels on each line.

Hence, the value of each pixel maintains an improvement of S/N ratio, and flicker components can be detected with high accuracy, even if shutter timing is different for every line.

The flicker correction program may comprise a step for taking in images having different shutter times, a step for judging the occurrence of flicker based on the comparison result of the images having different shutter times and a step for setting shutter timing to be an integral multiplication of a flicker period when the occurrence of flickering is detected.

Hence, the affect of flicker can be reduced only by changing shutter timing, even if an image is picked up with changing shutter timing for each line under a flicker light source. Thus, the image quality is improved.

In the flicker correction program, the shutter time may be the shortest of the time for no flicker to occur and the further shorter time compared with it.

Hence, it is possible that flicker components can be extracted with high accuracy while restraining the possibility that flicker components are buried within the drift of brightness of a subject itself and corrected when various subjects come to be picked up images.

In the flicker correction program, the shutter time may be the shortest of the time for no flicker to occur and ½ thereof.

Hence, it is possible to emphasize the variation of flicker components while an amount of exposure at the time of shortening shutter time is maintained. Thus, flicker components can be extracted with high accuracy, even if various subjects come to be picked-up images.

In the flicker correction program, the step of flicker judging may further comprise a step for analyzing flicker components as a frequency component corresponding to each image having a different shutter time, and a step for judging that flicker occurs at the time when the difference among flicker components extracted from each image signal is more than a regulated value.

Hence, it is possible to extract flicker components effectively from an image where the light and shade of a subject coexist. Thus, flicker components can be detected with high accuracy, even if a subject is picked up normally.

In the flicker correction program, the step for frequency analysis may complete a discrete Fourier transformation of the first dimension based on the result of adding the values of pixels on each line.

Hence, the value of each pixel maintains an improvement of S/N ratio, and flicker components can be detected with high accuracy and corrected, even if shutter timing is different for every line.

An image picking-up apparatus comprises an image sensing element picking up an image by a shutter operation for each line, a flicker detection apparatus taking in a plurality of images having different shutter times, and judging the occurrence of flicker based on the variation of flicker components extracted from the images having different shutter times; and a shutter-time controller controlling shutter time of the image sensing element based on the result of judging the occurrence of flicker.

Hence, it is possible to extract flicker components even if a normal subject is picked up without using a special subject having an entire pure white surface. Thus, the quality of an image picked up under a flicker light source can be improved thereby, even if the shutter timing of each line of an image pick up means is different.

DETAILED DESCRIPTION OF THE PREFERRED EMBODIMENT OF THE PRESENT INVENTION

Figure 1:
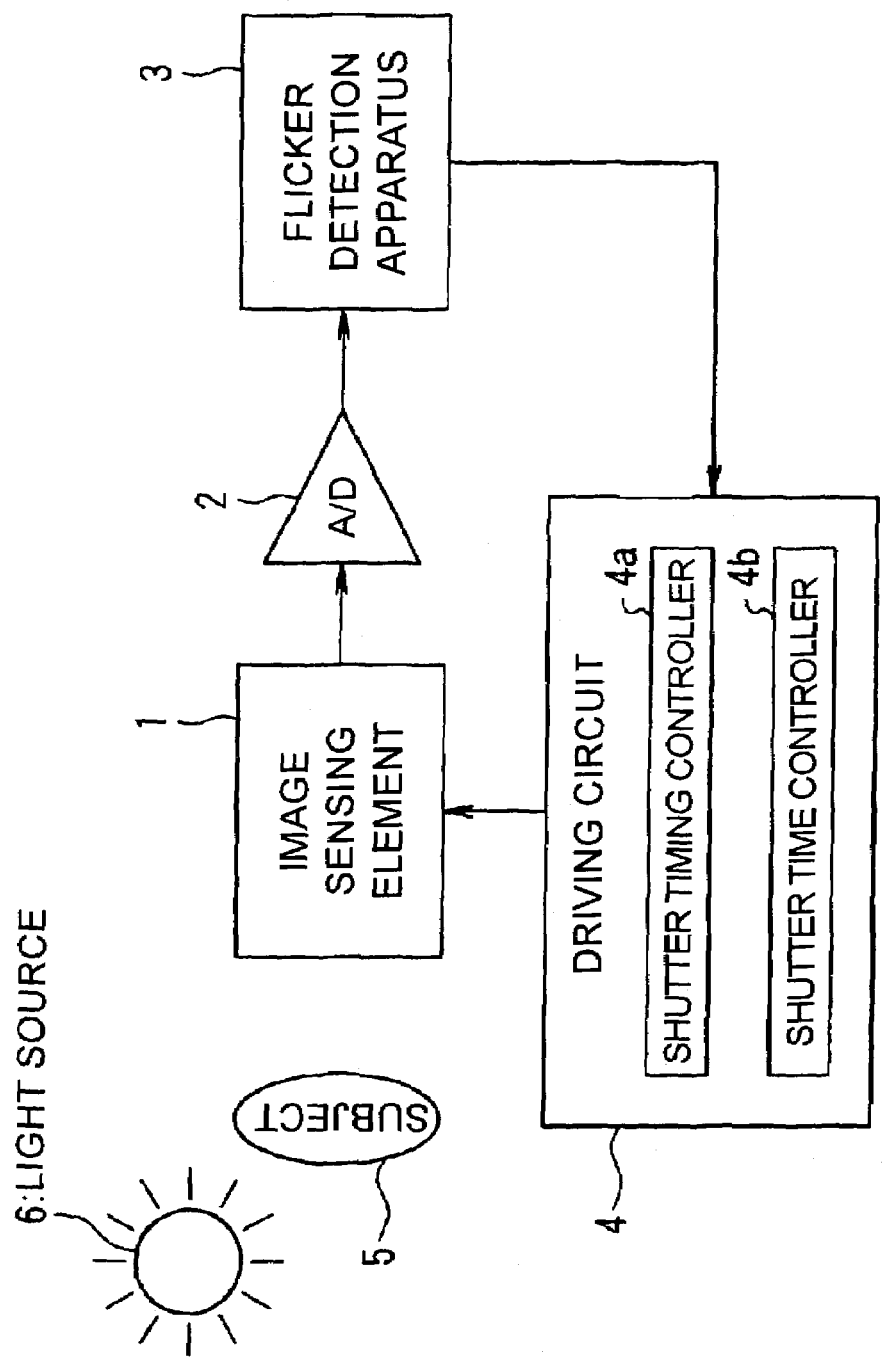
FIG. 1 shows a block diagram of an image-pickup apparatus related to one embodiment of the present invention.

A method of flicker detection with regard to an embodiment of the present invention will be explained with reference to the accompanying drawings. FIG. 1 shows a schematic diagram of one embodiment of the present invention. In FIG. 1, an image-pickup apparatus comprises an image sensor element 1, an A/D converter 2 which converts an analog image signal output from the image sensor element 1 into a digital image signal, a flicker detection apparatus 3 for detecting flicker based on an image sensed by the image sensor element 1 and a driving circuit 4 to drive the image sensor element 1.

Further, the driving circuit 4 includes a shutter-timing controller 4a and a shutter-time controller 4b. The shutter-timing controller 4a controls shutter timing of the image sensor element 1 for each line. The shutter-time controller 4b controls the shutter time of the image sensor element 1 for each line. Here, the image sensor element 1 picks up an image by using a device like a CMOS sensor, for example, and an exposure method similar to a focal plane system.

Further, at the time of detecting flicker, the flicker detection apparatus 3 controls the shutter time of the image sensor element 1 via the shutter-time controller 4b. Then, two images having different shutter times are taken in from the image sensor element 1. And the flicker detection apparatus 3 extracts a spatial frequency component based on flicker components from two images taken in from the image sensor element 1 and examines variations of this spatial frequency component. Further, in the case when the spatial frequency component based on flicker components is larger as compared to variations of brightness of an image at the time of changing the shutter time, it is judged that flicker occurs.

Namely, when the shutter time of the image sensor element 1 is shortened, an amount of light exposure of the image sensor element 1 is decreased by an amount equal to such shortened time, and the brightness of an image picked up by the image sensor element 1 is decreased by an amount equal to such shortened time. Further, when optical brightness of the light source 6 does not vary in terms of time, an amount of light emitted in each pixel of the image sensor element 1 is constant, if it is exposed for any time. Hence, when shutter time is shortened, light exposure of each pixel of the image sensor element 1 is decreased uniformly.

On the other hand, when the light source 6 is a flicker light source, an amount of light emitted in each pixel of the image sensor element 1 varies, if the timing of exposure of each pixel is different, since optical brightness varies periodically. Then, in case of long shutter time, an amount of the light exposure is uniform among pixels since the image sensor element 1 is exposed during the term from the time of high brightness to the time of low brightness. On the other hand, in case of short shutter time, a pixel in one line is exposed at the time of high brightness and a pixel on another line is exposed at the time of low brightness.

Figure 2:
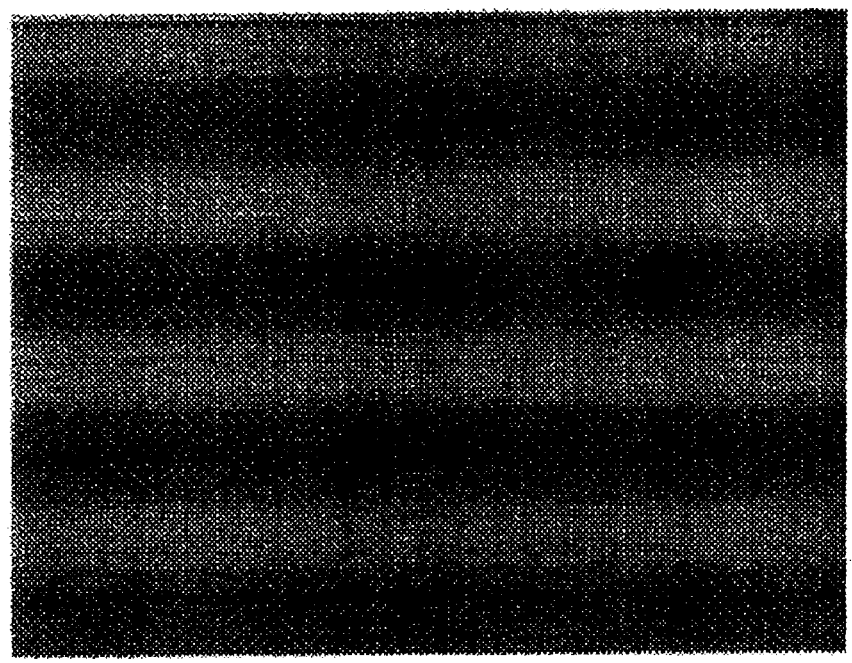
FIG. 2 shows the shutter time dependence nature of flicker image related to a one embodiment of the present invention.
Figure 2:
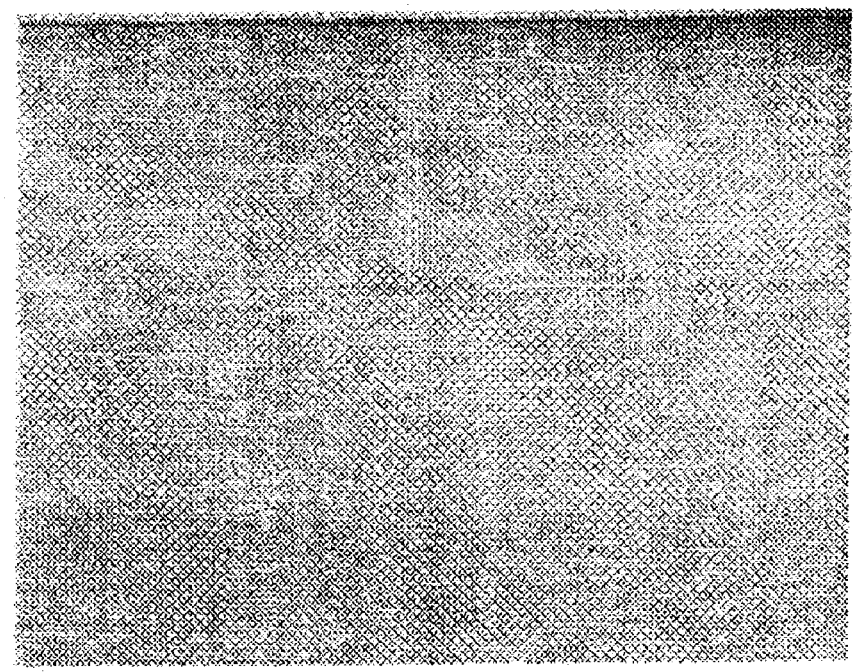

Hence, it is possible that the variation of flicker components is emphasized as compared to the variation of brightness of an image at the time of changing shutter time, through picking up an image with changing shutter times. Thus, the flicker component can be extracted effectively from an image in which the light and shade of a subject 5 coexist. FIG. 2 shows a diagram of the dependency of a flicker image on shutter time of one embodiment of the present invention. FIG. 2(*a*) shows that shutter time of the image sensor element 1 is $^{0.43}/_{120}$ sec, and FIG. 2(*b*) shows that shutter time of the image sensor element 1 is $^{1}/_{120}$ sec. Here, scanning time per 1 line is defined as shutter time and the same unit is used. Further, a pure white image is used as the subject 5, a fluorescent lamp is used as the light source 6 and the light source 6 is driven by power frequency=60 Hz.

In FIG. 2(*a*), when shutter time is $^{0.43}/_{120}$ sec, it is recognized that flicker of the light source 6 is reflected to an image and lateral stripes occur in an image thereby. On the other hand, in FIG. 2(*b*), an image becomes bright with an increase of shutter time for the case $^{1}/_{120}$ sec. But, the influence of flicker of the light source 6 is decreased and lateral stripes of an image are almost extinguished thereby. Here, when shutter time is $^{1}/_{120}$ sec, it is equivalent to one period of flicker if the light source 6 is driven by power frequency=60 Hz.

Therefore, even if shutter timing for every line is changed under periodic variation of brightness of the light source 6, an amount of light emitted to each line can be uniform and lateral stripes of an image can be extinguished. On the other hand, when shutter time is $^{0.43}/_{120}$ sec, exposure time is limited to the range of high brightness of flicker on one line and exposure time is limited to the range of low brightness of flicker on another line. Hence, an amount of exposure light varies on each line so that stripes appear in an image.

Figure 3:
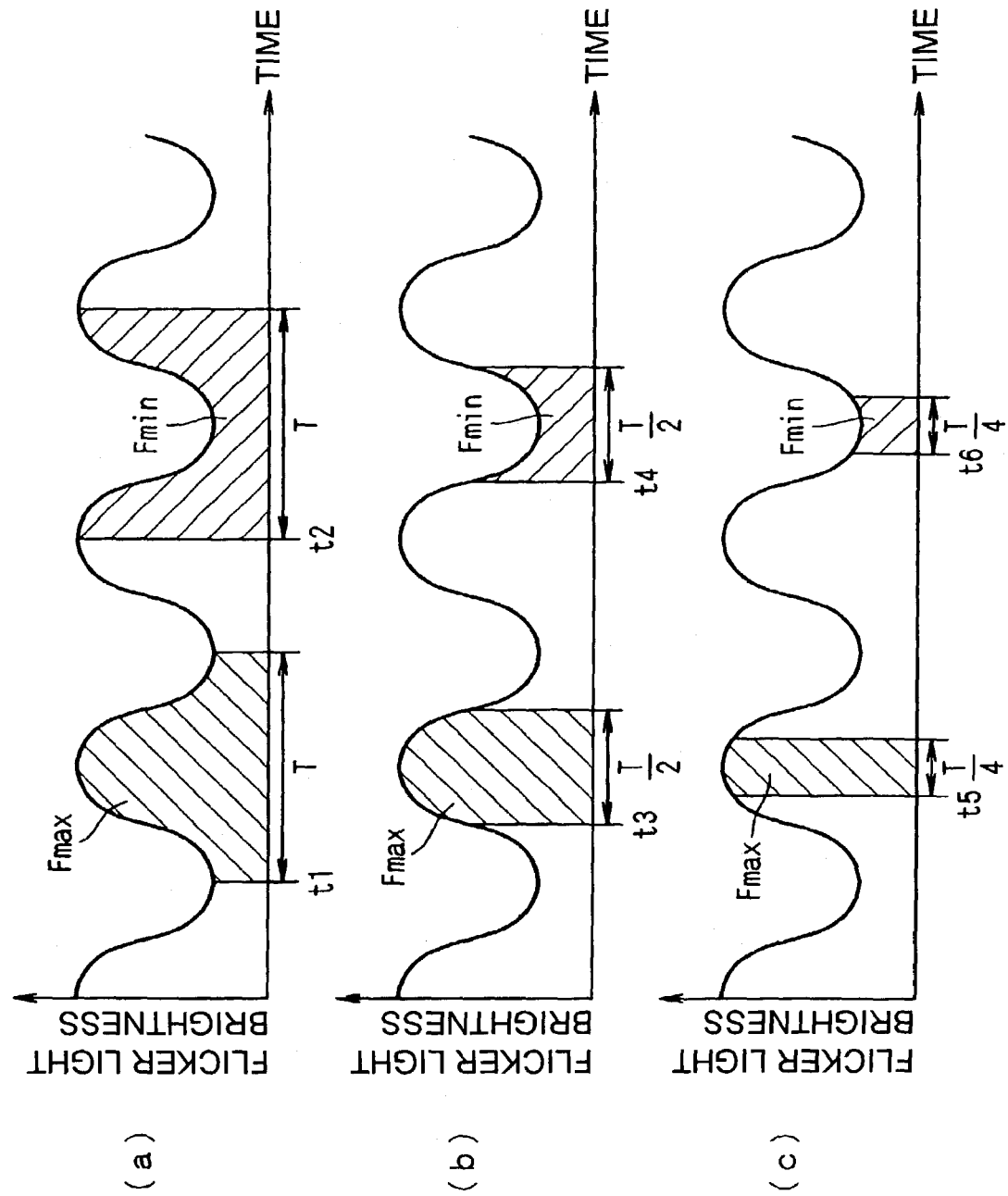
FIG. 3 explains the principle of flicker detection related to a one embodiment of the present invention.

FIG. 3 shows a diagram explaining the principle of a flicker detection method related to one embodiment of the present invention. In FIG. 3(*a*), when a flicker period of the light source 6 is set to be T and shutter time of the image sensor element 1 is set to T, the sensor element is exposed during a term from the time of the maximum optical brightness of the light source 6 to the time of its minimum, even if exposure is started at any timing t1, t2, an amount of light emitted to each pixel is constant. Hence, the maximum value F max. of the amount of light for each pixel coincides with the minimum value F min.

Next, in FIG. 3(*b*), when shutter time of the image sensor element 1 is set to be T/2, pixels of which exposure is started at timing t3, is focused within the range of high brightness of the light source 6 and exposed thereafter and pixels of which exposure is started at timing t4, is focused within the range of low brightness of the light source 6 and exposed thereafter. Hence, an amount of variation between the maximum value F max. and the minimum value F min. is increased thereby.

Further, in FIG. 3(*c*), when shutter time of the image sensor element 1 is set to be T/4, the range of light brightness at the exposure is further narrowed. Pixels of which exposure is started at timing t5 is further focused within the range of high brightness of the light source 6 and exposed thereafter and pixels of which exposure is started at timing t6, is focused within the range of low brightness of the light source 6 and exposed thereafter. Hence, the amount of variation between the maximum value F max. and the minimum value F min. is further increased thereby.

Since an amount of variation between the maximum value F max. and the minimum value F min. can be increased by shortening the shutter time of the image sensor element 1 to be less than the flicker period T, lateral stripes appearing in a pick-up image can be emphasized. Therefore, it can be judged, by examining resulting lateral stripes when shutter time of the image sensor element 1 is varied, whether the light source 6 is a flicker light source or not.

Here, the more the shutter time of the image sensor element 1 is shortened from the flicker period T of the light source 6, the more lateral stripes appearing on a picked up image can be emphasized. Hence, it is preferable that shutter time of the image sensor element 1 is shortened as much as it can to examine the affect of flicker. However, if shutter time of the image sensor element 1 is shortened too much, an amount of light exposure of the image sensor element 1 is reduced so that S/N ratio is deteriorated.

Figure 4:
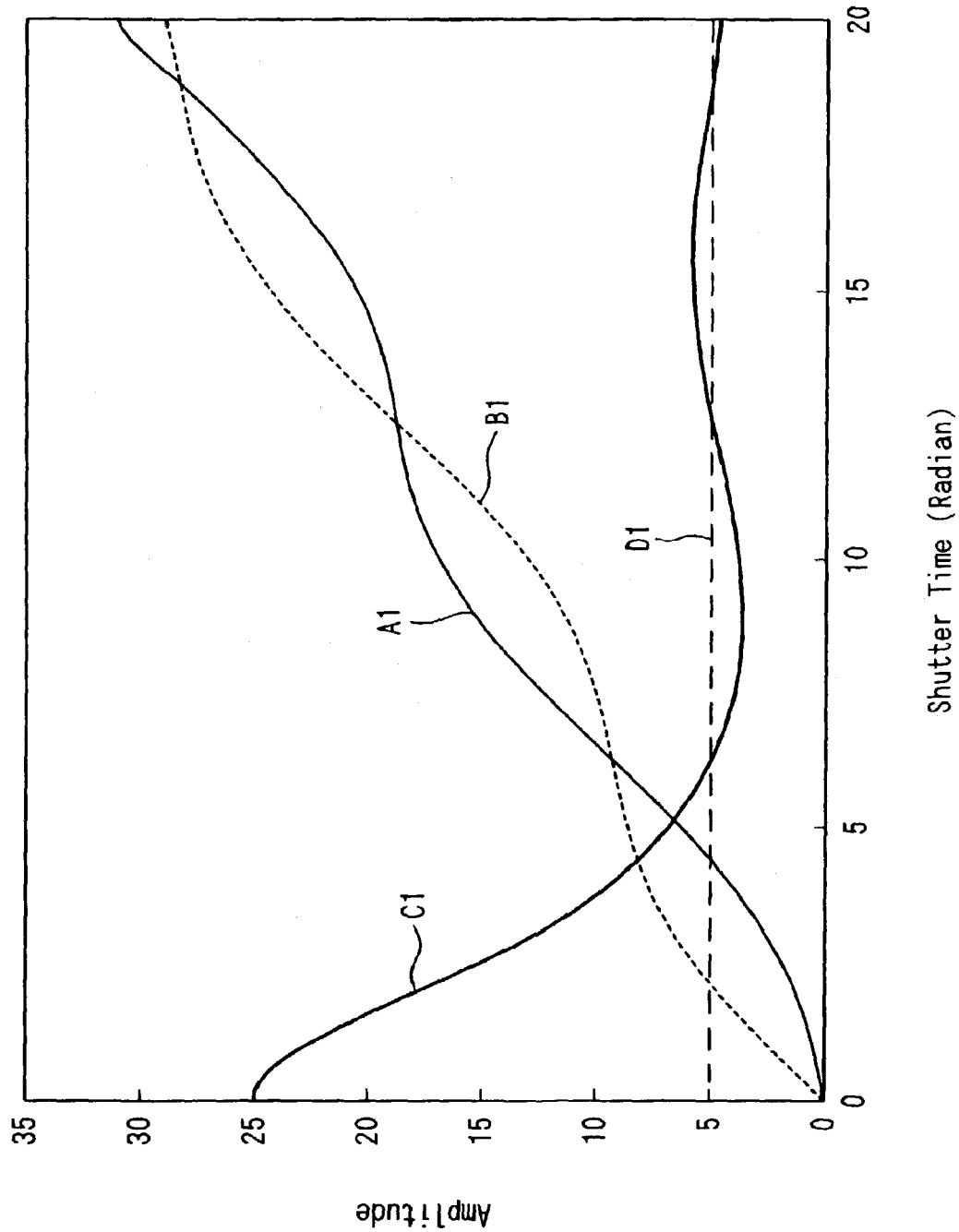
FIG. 4 shows shutter time related to one embodiment of the present invention and the relationship of shutter time with maximum/minimum magnitude of flicker.

In order to overcome such deterioration, it is desirable that shutter time of the image sensor element 1 is set to be a period of a flicker light source and ½ of it for example. FIG. 4 shows the relationship between the maximum value and the minimum value of amplitude by flicker and shutter time. Here, a fluorescent lamp is used as a flicker light source, and an amount of light of the fluorescent lamp is simplified with a sin wave toward an applied voltage. Such amount of light of a fluorescent lamp is added by offset A not to be zero when an applied voltage is changed between positive and negative.

Then, light brightness f(x) of a fluorescent lamp is defined as the following expression (1) if it obeys the above assumption;

$$f(x) = \sin x + A \tag{1}$$

Further, when an image is picked up with shutter time $\Delta t$ under the light source of which brightness varies such as f(x), the amount of light g(x) caught by the image sensor element 1 is an integral of light brightness f(x) by shutter time as shown in the expression (2).

$$g(x) = \int_t^{t+\Delta t} f(x) dx \tag{2}$$

When the expression (2) is transformed to obtain the maximum value and the minimum value, then the following expression (3) is obtained;

$$g(x) = 2 \cdot \sin(\Delta t/2)/\sin((2t+\Delta t)/2) + \Delta t A \tag{3}$$

Therefore, the maximum value of the peak 1 ($\Delta t$) and the minimum value of the peak 2 ($\Delta t$) of the expression (2) are obtained by using the expression (3) as shown in the expressions (4) and (5).

$$\text{the peak 1 } (\Delta t) = 2 \cdot \sin(\Delta t/2) + \Delta t A \tag{4}$$

$$\text{the peak 2 } (\Delta t) = -2 \cdot \sin(\Delta t/2) + \Delta t A \tag{5}$$

Hence, the maximum value of the peak 1 ($\Delta t$) and the minimum value of the peak 2 ($\Delta t$) of the expressions (4) and (5) are illustrated as the curves A1 and B1 in FIG. 4. Further, a curve C1 in FIG. 4 shows the ratio of the maximum value of the peak 1 (Δt) with the minimum value of the peak 2 (Δt). In FIG. 4, five times of this ratio; the peak 1 (Δt)/the peak 2 (Δt)×5is shown in order to view it easily.

Further, a curve D1 in FIG. 4 shows the coincidence of the maximum value of the peak 1 (Δt) with the minimum value of the peak 2 (Δt). In FIG. 4, five times of this coincided value is shown to compare with the curve C1. Here, when shutter time in which the ratio of the maximum value of the peak 1 (Δt) with minimum value of the peak 2 (Δt): the peak 1 (Δt)/the peak 2 (Δt) is 1, this maximum value of the peak 1 (Δt) coincides with minimum value of the peak 2 (Δt). Hence, an image without flicker can be obtained even when an image is picked up under a flicker light source.

Further, in FIG. 4, shutter time Δt, which coincides the maximum value of the peak 1 (Δt) with the minimum value of the peak 2 (Δt) corresponds to the intersecting point of the curve C1 with the curve D1. Then, it is clarified that it corresponds to shutter time Δt of integral multiplication of 2π (Radian). Further, in FIG. 4, the more the ratio of the maximum value of the peak 1 (Δt) with the minimum value of the peak 2 (Δt); peak 1 (Δt)/peak 2 (Δt) comes off from 1, the more the difference between maximum peak 1 (Δt) and minimum peak 2 (Δt) is large. Then, flicker can be easily detected since the affect of flicker appears in an image strongly.

Then, the more shutter time Δt is shortened, the more the difference between the maximum value of the peak 1 (Δt) and the minimum value of the peak 2 (Δt) becomes large. Then, flicker can be detected more easily. On the other hand, the more shutter time Δt is lengthened, the more the difference between the maximum value of the peak 1 (Δt) and the minimum value of the peak 2 (Δt) becomes small. Then, it is difficult to determine when lateral stripes occur due to the affect of flicker, or the case when such stripes occur due to the coexistence of the light with shade in a subject.

Hence, it is preferable that an image, which is picked up during the shutter time Δt=2π (Radian) when a maximum value of the peak 1 (Δt) coincides with minimum value of the peak 2 (Δt) at first, and an image, which is picked up during the shutter time Δt shorter than the above, are used as an image for detecting flicker. Further, if an image is picked up normally from the subject 5 under a flicker light source, the light and shade in a subject are also picked up. Hence, discrete Fourier transform is completed in order to detect only the spatial frequency component of flicker from a picked up image.

Here, frequency of the flicker light source is generally 50 Hz or 60 Hz. Hence, only these spatial frequency components are extracted by the discrete Fourier transformation. But when using the exposure method similar to a focal plane shutter system, the shutter timing is the same for pixels existing on the same line. Hence, the value (it is referred to as line value hereafter) obtained from averaged values of pixels for each line is used so that flicker components are extracted by implementing discrete Fourier transformation on the first dimension to this line value.

For example, when pixels of which numbers are 360 long by 290 broad and it's image is CIF size, pixel values of 360 pieces are averaged and 290 data can be obtained. When total numbers of pixels in the image sensing element are 300 in the longitudinal direction, it becomes 0.1111 ms/line and the following expressions (6) . . . (9) can be obtained.

$$50\cos(x)=\cos(2\pi\times(50\times2)\times0.1111)/LN \quad (6)$$

$$50\sin(x)=\sin(2\pi\times(50\times2)\times0.1111)/LN \quad (7)$$

$$60\cos(x)=\cos(2\pi\times(60\times2)\times0.1111)/LN \quad (8)$$

$$60\sin(x)=\sin(2\pi\times(60\times2)\times0.1111)/LN \quad (9)$$

Here, LN is total numbers of lines. Further, in either case of 50 Hz or 60 Hz, flicker occurs by two times of the power frequency in the fluorescent lamp. Furthermore, it is necessary to put a window function such as a humming window to expressions (6) . . . (9) since limited frequency analysis will be completed.

Further, in case of a color image, the flicker component can be detected by extracting only a change of the brightness component. Hence, when, for example, color filters of RGB arranged in a mosaic array are coated over the image sensor element 1, flicker components may be detected by using only a green pixel.

Figure 5:
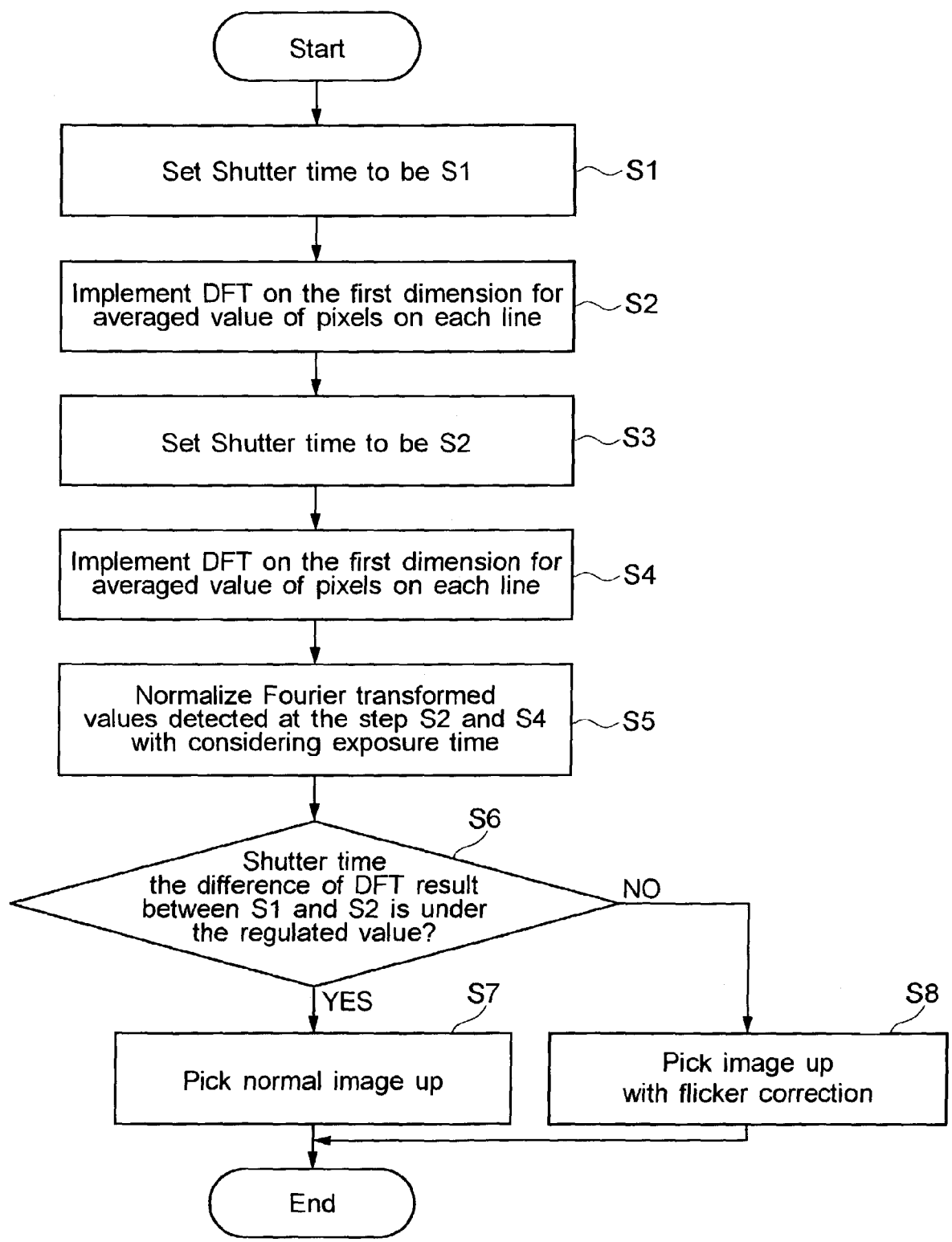
FIG. 5 is a flow chart showing actuation of a flicker detection means related to one embodiment of the present invention.

FIG. 5 shows a flow chart of the operation of the flicker detection apparatus related to the embodiment of the present invention. In FIG. 5, the flicker detection apparatus 3 of FIG. 1 sets shutter time of the image sensor element 1 to be S1 via shutter-time controller 4b and takes in image data which are picked up during the time S1 via A/D converter 2 (step S1).

Next, the flicker detection apparatus 3 averages values for each line according to image data picked up during shutter time S1 to obtain the line value and implements discrete Fourier transformation on one dimension toward these line values (step S2). Here, shutter time S1, for example, may be the shutter time coinciding with a period of the flicker light source.

Next, the flicker detection apparatus 3 sets shutter time of the image sensor element 1 to be S2 via the shutter-time controller 4b and takes in image data which are picked up during the time S2 via the A/D converter 2 (step S3). Next, the flicker detection apparatus 3 averages values for each line according to image data picked up during shutter time S2 to obtain the line value and implements discrete Fourier transformation on the first dimension toward these line values (step S4).

Here, shutter time S2, for example, may be ½ of a period of the flicker light source. Next, discrete Fourier-transformed values detected at the steps S2 and S4 are normalized with consideration of exposure time (step 5). Here, the normalized value corresponding to a discrete Fourier transformed value on the first dimension for an image picked up during shutter time S1 is referred to as F11. The normalized value corresponding to a discrete Fourier transformed value on the first dimension for an image picked up during shutter time S2 is referred to as F12. These normalized values are called flicker detection coefficients.

The Flicker detection device 3 compares F12 with F11 so that it determines whether the difference of these values is less than a regulated value (step S6). Then, when the difference of these values is under the regulated value, the light source 6 in FIG. 1 is not considered as a flicker light source so that an image is picked up normally (step S7). On the other hand, when the difference of this value is over the regulated value, the light source 6 in FIG. 1 is considered a flicker light source so that an image is picked up with implementation of flicker correction (step S8).

Figure 6:
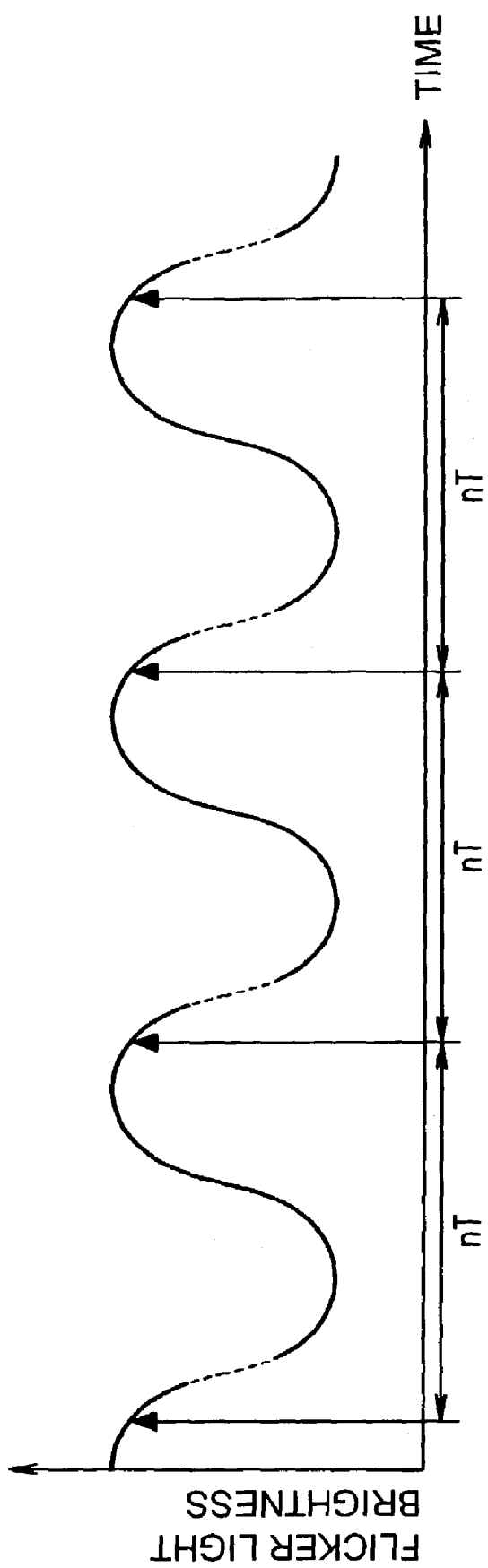
FIG. 6 shows a shutter timing setting method of an image-pickup apparatus related to one embodiment of the present invention.

Here, as a method of picking up an image with implementation of flicker correction, shutter timing for each line can be set to be an integral multiplication of 2π (Radian). FIG. 6 shows a method of setting shutter timing in the image-pickup apparatus related to the embodiment of the present invention. In FIG. 6, when a period of flicker light is T, shutter timing for each line is set to be nT (n, positive integer) so that the range of brightness variation of flicker light among the lines can be coincided with each other.

Figure 7:
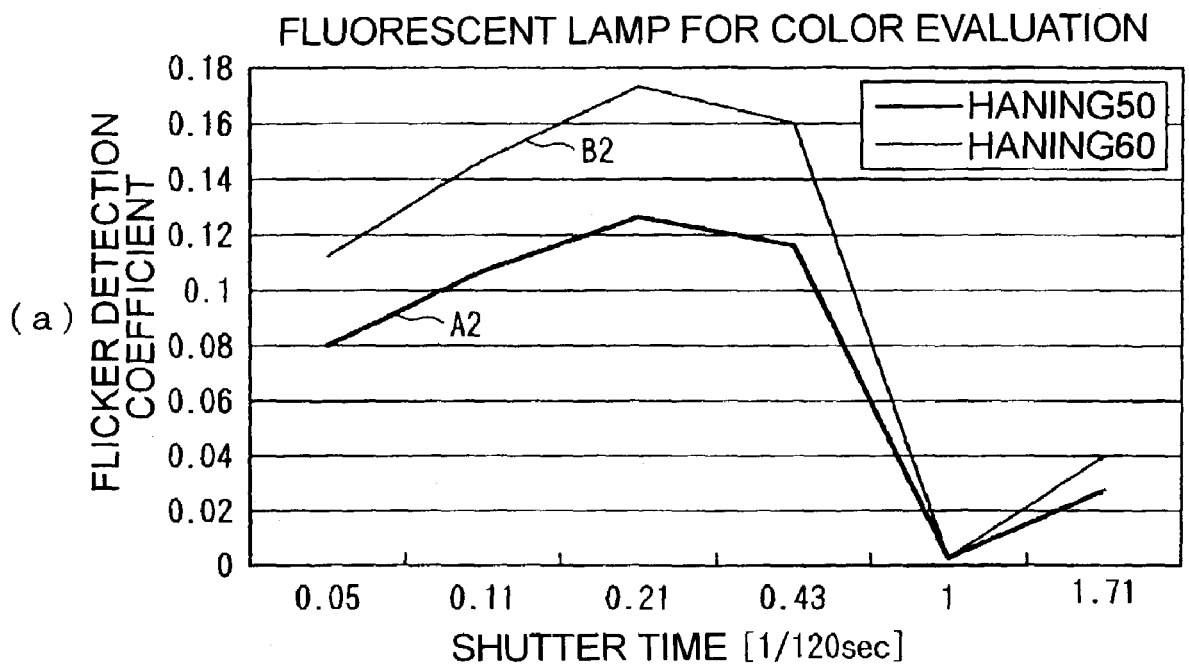
FIG. 7 shows the shutter time dependency of the flicker detection coefficient related to one embodiment of the present invention.
Figure 7:
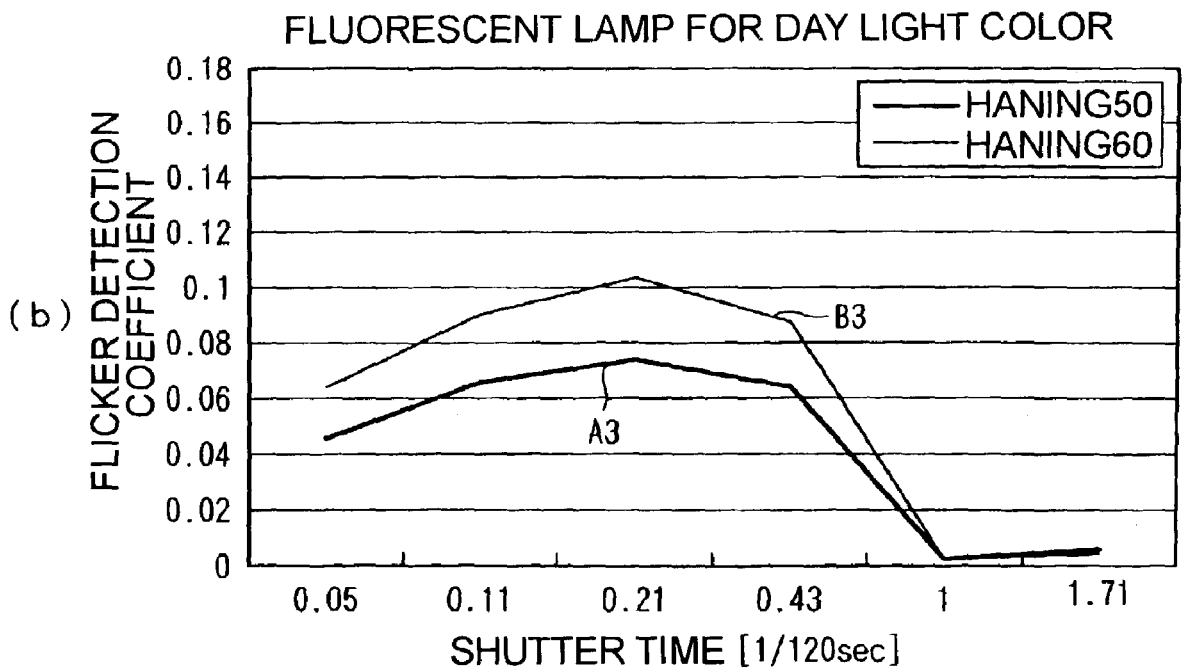
Figure 8:
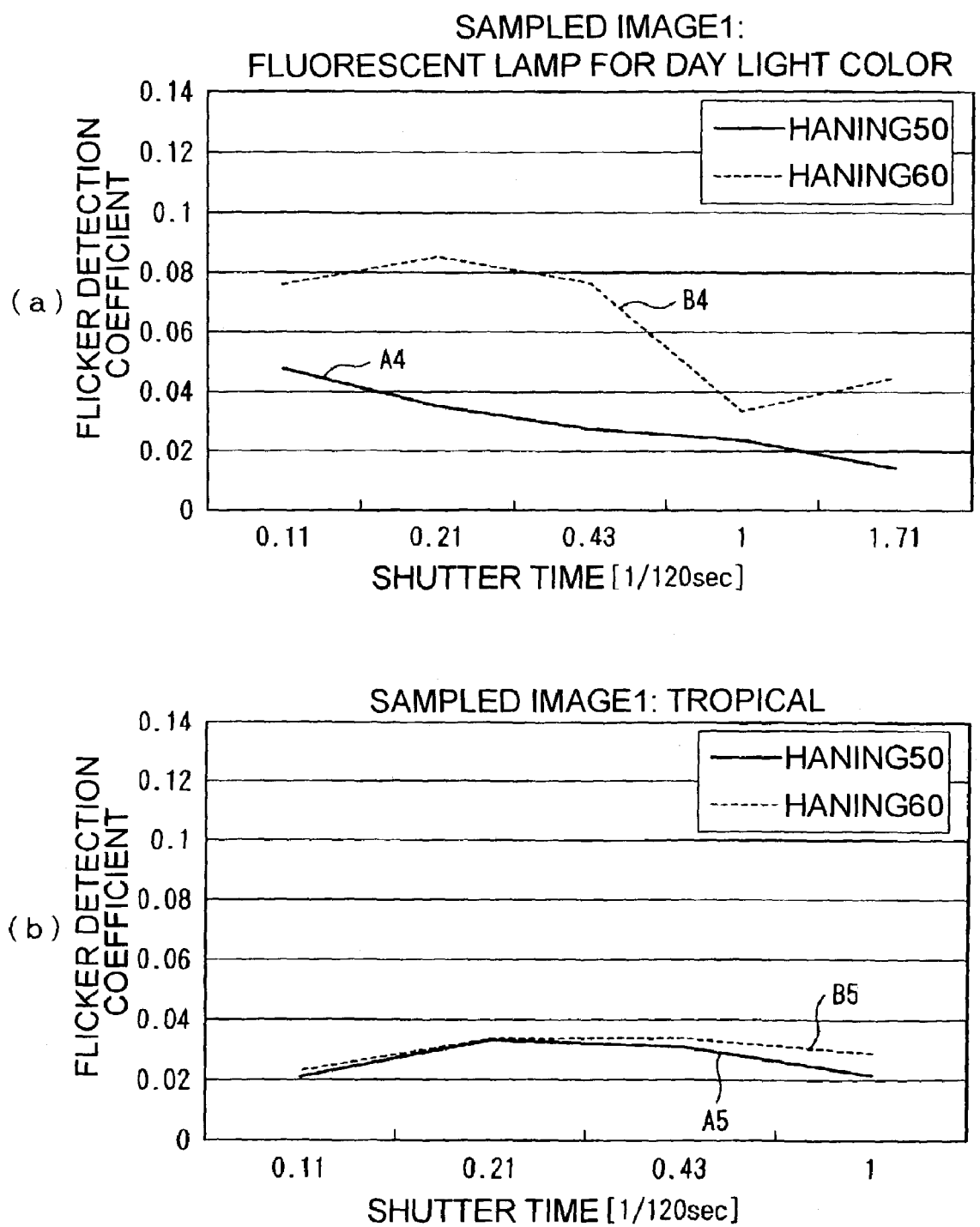
FIG. 8 shows the shutter time dependency of the flicker detection coefficient using a sampled image of FIG. 12(a).
Figure 9:
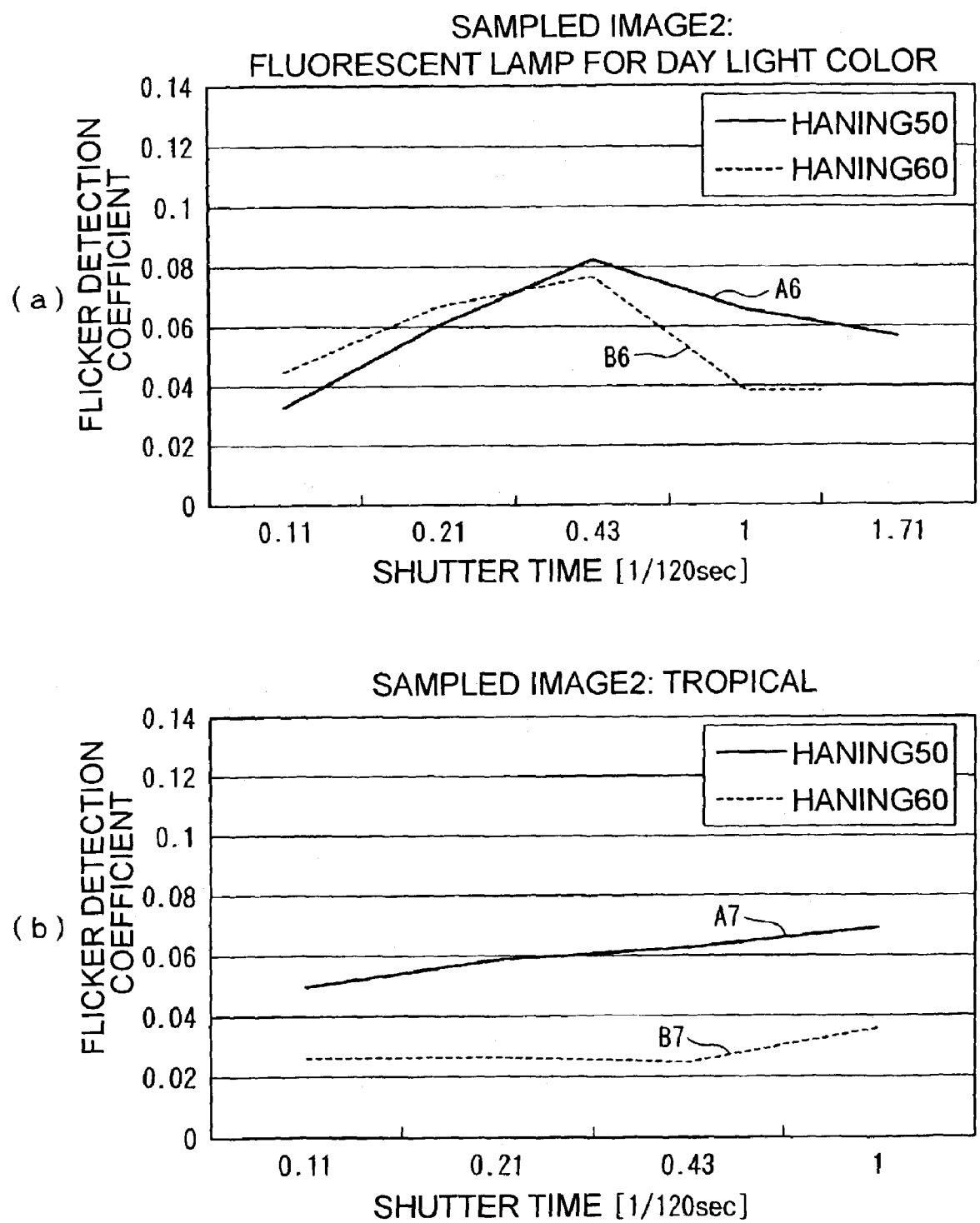
FIG. 9 shows the shutter time dependency of the flicker detection coefficient using a sampled image of FIG. 12(b).
Figure 10:
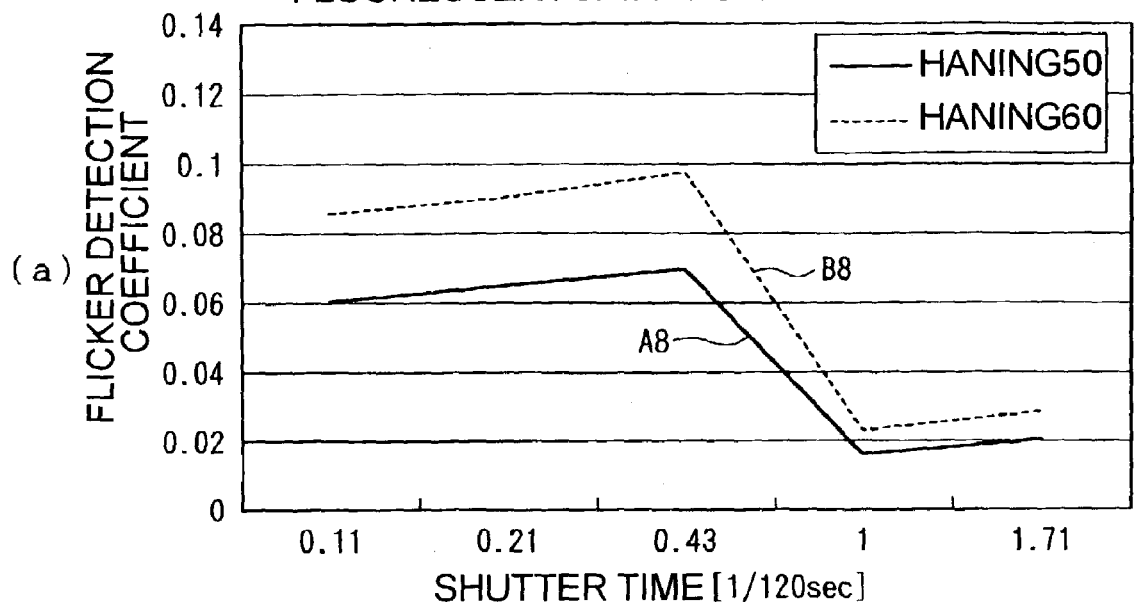
FIG. 10 shows the shutter time dependency of the flicker detection coefficient using a sampled image of FIG. 13(a).
Figure 10:
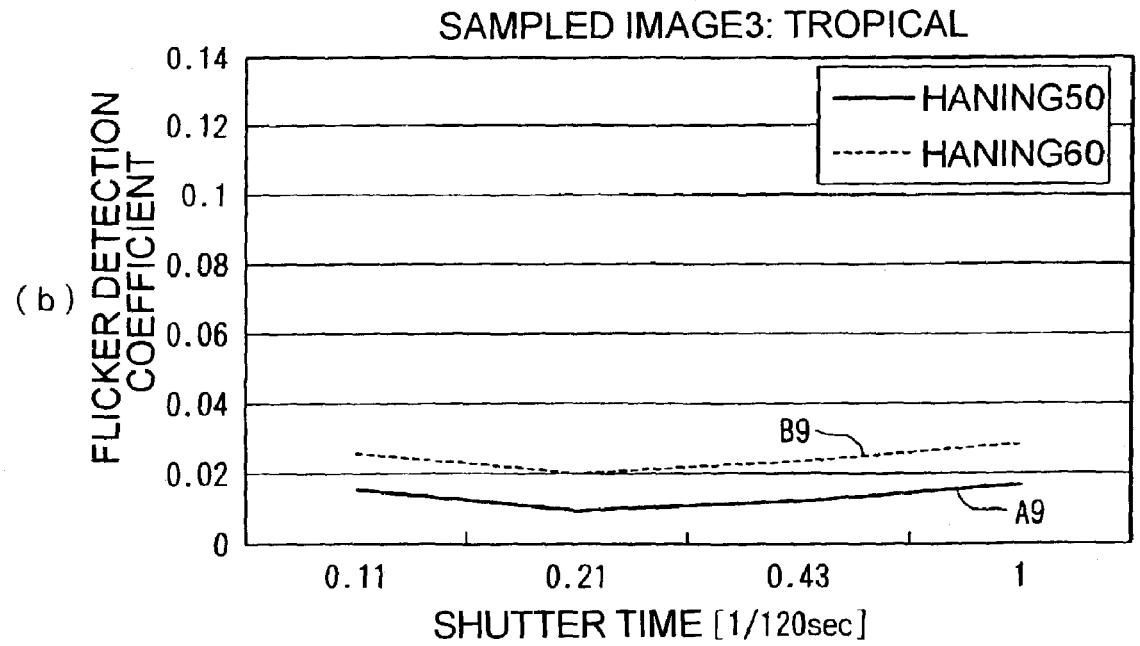
Figure 11:
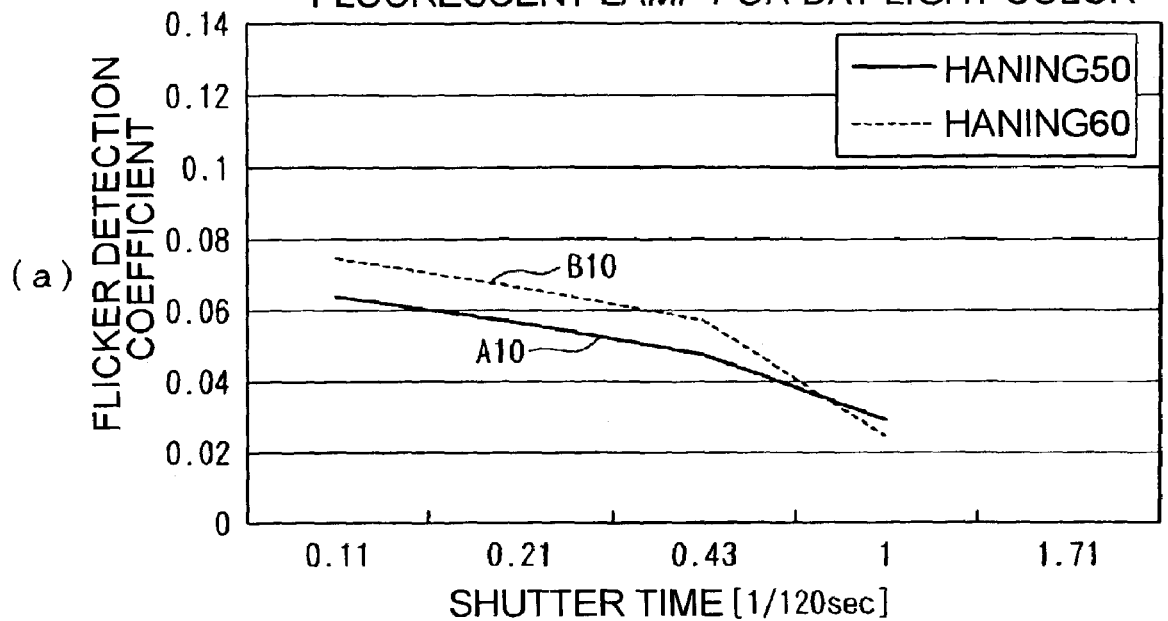
FIG. 11 shows the shutter time dependency of the flicker detection coefficient using a sampled image of FIG. 13(b).
Figure 11:
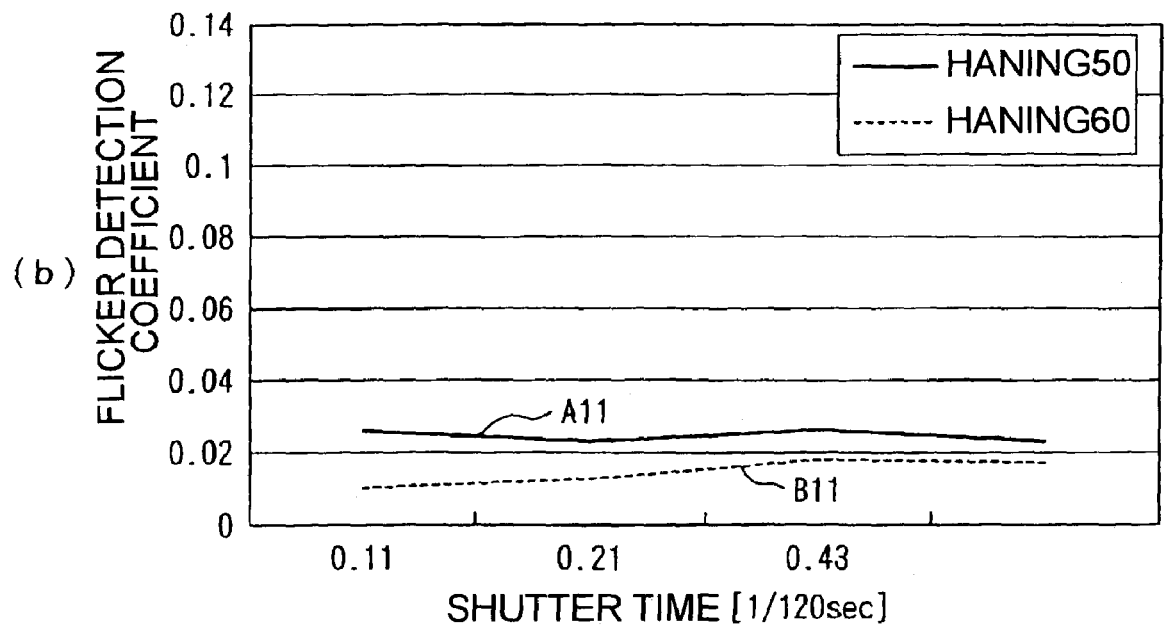
Figure 12:
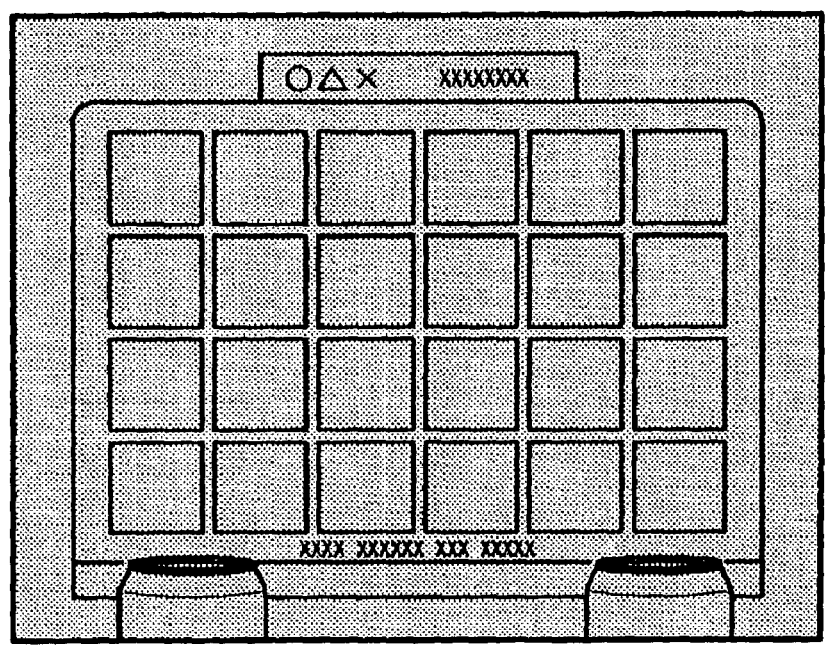
FIG. 12 shows a sampled image employed in the flicker detection experiment related to one embodiment of the present invention.
Figure 12:
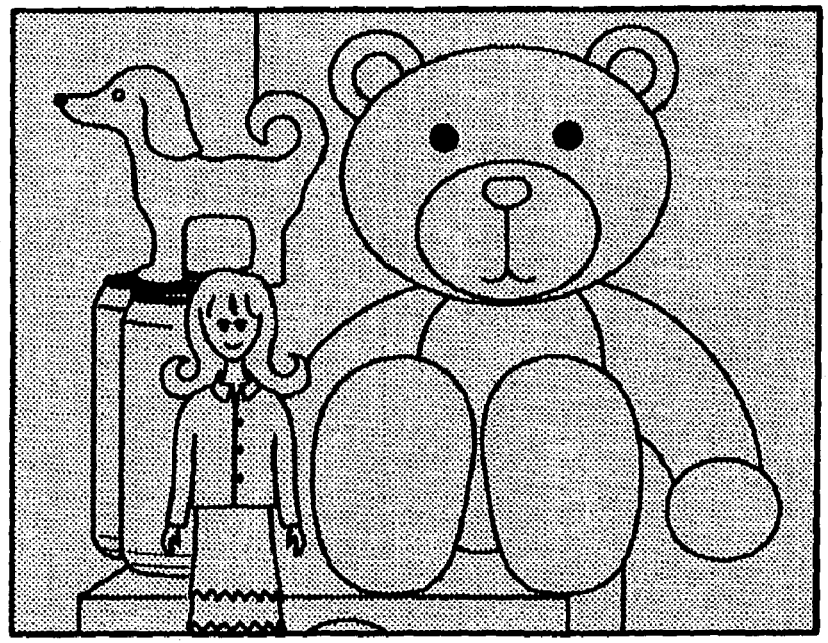
Figure 13:
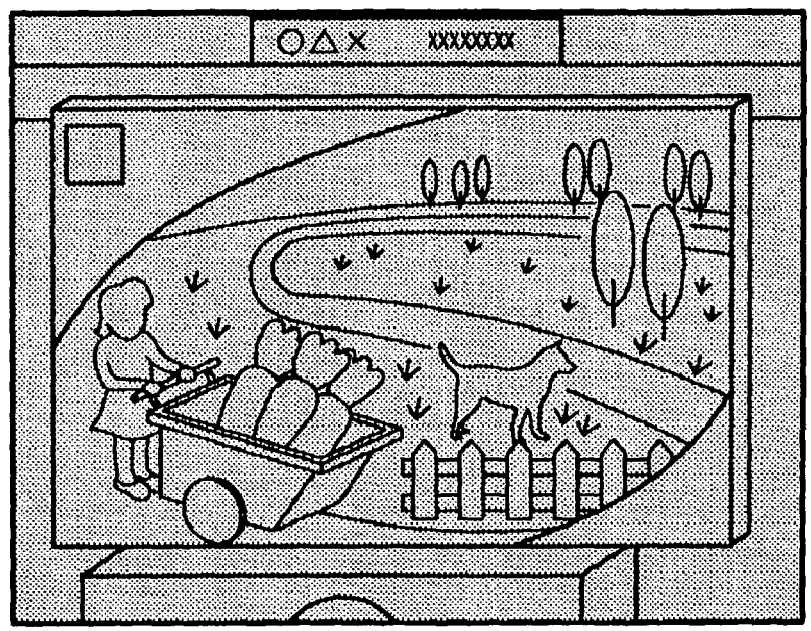
FIG. 13 shows a sampled image employed in the flicker detection experiment related to one embodiment of the present.
Figure 13:
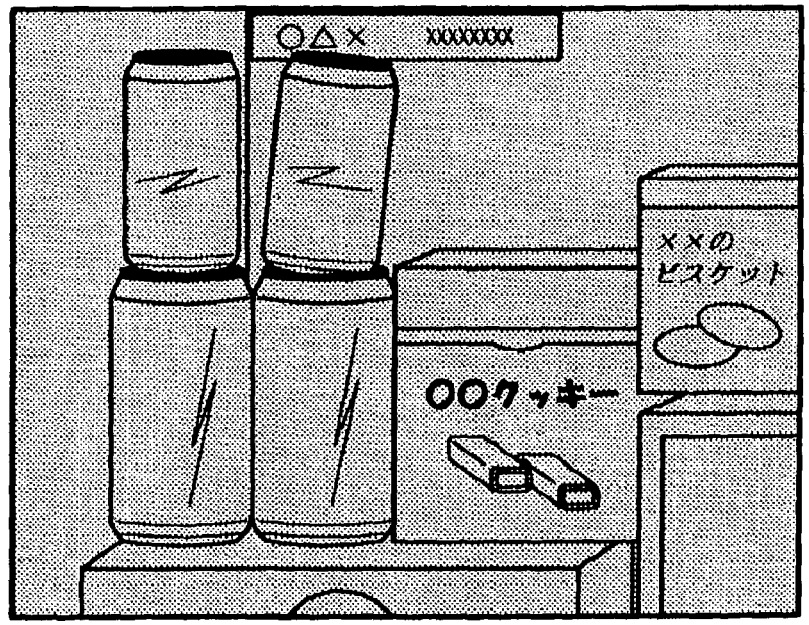

Hence, even if an image is picked up under the flicker light source, image quality can be improved by restraining the affect of flicker. FIG. 7 shows shutter time dependency of a flicker detection coefficient related to the embodiment of the present invention. Here, it is evaluated when a pure white image is used as the subject 5, a fluorescent lamp for color evaluation and a fluorescent lamp of day light color are used as the light source 6. Then, flicker components with both 50 Hz and 60 Hz are calculated since it is necessary to detect both components when the image sensor element 1 is actually used.

Furthermore, in this evaluation, a window function should be used since discrete Fourier transformation is a limited frequency analysis so that a Hanning window was used as a window function. Here, FIG. 7(a) shows the evaluation result when a fluorescent lamp for color evaluation is used. FIG. 7(b) shows the evaluation result when a fluorescent lamp of daylight color is used. In FIG. 7, A2 and A3 show the case when flicker component of 50 Hz is detected, and B2 and B3 show the case when flicker components of 60 Hz is detected.

The affect of a fall of an amount of ambient light is considered in an actual optical lens. Hence, it may be expected that the affect of a fall of an amount of ambient light is reduced by using a Hanning window as a window function. Further, it can be recognized that flicker components are detected during shutter time except the time without the effect of flicker that is set to $1/120$ sec.

Hence, the occurrence of flicker can be detected by comparing the flicker detection coefficient of an image picked up during shutter time without the effect of flicker of $1/120$ sec with the flicker detection coefficient of an image picked up during other shutter times. Here, the shutter time of $1/120$ sec without the affect of flicker and the shutter time of $0.43/120$ sec; roughly ½ of the above are used as shutter time for two images employed in a comparison of flicker components. Hence, the difference of flicker detection coefficients can be increased so that the occurrence of flicker can be detected more accurately.

Here, shutter time of $1/120$ sec and shutter time that is longer than that can be used as shutter time of two images. But, if shutter time is too long, there is the possibility that the output from the image sensor element 1 by itself is saturated, so that flicker components are buried. On the other hand, if light exposure is too short, the affect of noise increases so that detection accuracy of flicker components is deteriorated.

Hence, it is preferable that the shutter time to obtain a flicker detection coefficient is set to be the most short shutter time without flicker and around ½ thereof. Next, an evaluated case when a sampled image is obtained from a normal image as the subject 5 instead of a pure white sample image will be explained.

FIGS. 8-11 show shutter time dependency of the flicker detection coefficient when the sampled images of FIGS. 12(a) to 13(b) are used. Here, a fluorescent lamp of daylight color and a case of using the tropical TL-500+5700K light filter as the light source 6 are evaluated and flicker components of either 50 Hz or 60 Hz are calculated. Further, this evaluation is completed by using a Hanning window as a window function.

Here, the tropical TL-500+5700K light filter is used as a light source without flicker and evaluated compared with a case of using a fluorescent lamp of daylight color. According to FIGS. 8(b) to 11(b), it is recognized that a flicker detection coefficient is almost constant when the tropical TL-500+ 5700K light filter (without flicker) is used, even if shutter time is changed.

On the other hand, in FIGS. 8(a) to 11(a), the flicker detection coefficient varies by changing shutter time when a fluorescent lamp of daylight color (with flicker) is used. Hence, it is recognized that the flicker detection coefficient of an image, which is picked up with a shutter time of $1/120$ sec without the affect of flicker, is different from the flicker detection coefficient of an image picked up with other shutter times.

However, as shown in FIGS. 12(a) to 13(b), when a sample image with the light and shade in itself is used as the subject 5, there is a tendency that the affect of flicker does not stand out from the affect of the light and shade in the subject 5 in itself, compared with the case when a pure white sample image is used. Further, for example, shutter time of $1/120$ sec without the affect of flicker and shutter time of roughly ½ of the above are used as shutter time for two images employed in comparing flicker components.

Hence, the difference among flicker detection coefficients can be increased so that it is possible to determine whether a flicker light source exists or not by examining whether such difference is more than 0.03 or not.

Effects of the Invention

As explained above, according to the present invention, flicker components can be extracted effectively from an image obtained from a subject where the light and shade coexist. Hence, it is possible to detect the occurrence of flicker more accurately even if a subject is picked up normally.

The entire disclosure of Japanese Patent Application Nos. 2002-084342 filed Mar. 25, 2002 and 2003-014742 filed Jan. 23, 2003 are incorporated by reference.

What is claimed is:

1. A flicker detection apparatus comprising:
    an image taking-in means using an exposure method of a focal plane system, for taking-in a first image in a first shutter time which is a shortest time for no flicker to occur and for taking-in a second image in a second shutter time which is shorter than the shortest time for no flicker to occur; and
    a flicker judging unit configured to judge flicker occurrence based on a comparison between the first image and the second having different shutter times.

2. The flicker detection apparatus according to claim 1, wherein the second shutter time is ½ of the shortest time for no flicker to occur.

3. The flicker detection apparatus according to claim 1 further comprising a frequency analysis unit configured to analyze flicker components as a frequency component corresponding to each of the first and second images, and wherein flicker is recognized at a time when a difference among flicker components extracted from each image is more than a regulated value.

4. The flicker detection apparatus according to claim 3, wherein the frequency analysis unit completes a discrete Fourier transformation on a first dimension based on a sum of pixel values on each line.

5. A flicker correction apparatus comprising:
    an image taking-in means using an exposure method of a focal plane system, for taking-in a first image in a first shutter time which is a shortest time for no flicker to occur and for taking-in a second image in a second shutter time which is shorter than the shortest time for no flicker to occur;

a flicker judging unit configured to judge flicker occurrence based on a comparison between the first image and the second image having different shutter times; and a shutter timing setting unit configured to set shutter timing to be an integral multiplication of a flicker period when the flicker occurrence is detected.

6. The flicker correction apparatus according to claim 5, wherein the second shutter time is ½ of the shortest time for no flicker to occur.

7. The flicker correction apparatus according to claim 5 further comprising a frequency analysis unit configured to analyze flicker components as a frequency component corresponding to each of the first and second images, and wherein flicker is judged to occur at a time when a difference among flicker components extracted from each image is more than a regulated value.

8. The flicker correction apparatus according to claim 7, wherein the frequency analysis unit completes a discrete Fourier transformation on a first dimension based on a sum of pixel values on each line.

9. An image picking-up apparatus comprising:
an image pick-up unit configured to pick up an image by a shutter operation for each line;
a shutter-time control unit configured to control a shutter time of the image pick-up means;
an image taking-in means using an exposure method of a focal plane system, for taking-in a first image in a first shutter time which is a shortest time for no flicker to occur and for taking-in a second image in a second shutter time which is shorter than the shortest time for no flicker to occur; and
a flicker judging unit configured to judge flicker occurrence based on a comparison between the first image and the second image having different shutter times.

10. The image picking-up apparatus according to claim 9, further comprising a shutter timing setting unit configured to set shutter timing to be an integral multiplication of a flickering period when the flicker occurrence is detected by the flicker judging unit.

11. The image picking-up apparatus claimed in claim 9, further comprising an out-of-focus image forming unit configured to control a lens position to obtain an out-of-focus image when an image taken in via the image taking-in means is picked up.

12. The image picking-up apparatus according to claim 9, wherein the second shutter time is ½ of the shortest time for no flicker to occur.

13. The image picking-up apparatus according to claim 9, wherein the flicker judging unit further comprises a frequency analysis unit configured to analyze flicker components as a frequency component corresponding to each of the first and second images, and flicker is judged to occur at a time when a difference among flicker components extracted from each image is more than a regulated value.

14. The image picking-up apparatus according to claim 13, wherein the frequency analysis means completes a discrete Fourier transformation of a first dimension based on a sum of pixel values on each line.

15. A flicker detection method, wherein taking in a first image using an exposure method of a focal plane system in a first shutter time which is a shortest time for no flicker to occur, taking in a second image using the exposure method of the focal plane system in a second shutter time which is shorter than the shortest time for no flicker to occur, and judging flicker occurrence by comparing the first image having the first shutter time with the second image having the second shutter time, are implemented by a computer.

16. The flicker detection method according to claim 15, Wherein the second shutter time is ½ of the shortest time for no flicker to occur.

17. The flicker detection method according to claim 15, wherein the judging flicker occurrence further comprises analyzing flicker components as a frequency component corresponding to each of the first and second images, and judging that flicker occurs at a time when a difference among flicker components extracted from each image is more than a regulated value.

18. The flicker detection method according to claim 17, wherein the analyzing flicker components completes a discrete Fourier transformation on a first dimension based on a sum of pixel values on each line.

19. A flicker correction method comprising taking in a first image using an exposure method of a focal plane system in a first shutter time which is a shortest time for no flicker to occur, taking in a second image using the exposure method of a focal plane system in a second shutter time which is shorter than the shortest time for no flicker to occur, judging flicker occurrence by comparing the first image having the first shutter time with the second image having the second shutter time, and setting shutter timing to be an integral multiplication of a flicker period when flicker occurrence is detected.

20. The flicker correction method according to claim 19, herein the second shutter time is ½ of the shortest time for no flicker to occur.

21. The flicker correction method according to claim 19, wherein the judging flicker occurrence further comprises analyzing flicker components as a frequency component corresponding to each of the first and second images, and judging that flicker occurs at a time when a difference among flicker components extracted from each image is more than a regulated value.

22. The flicker correction method according to claim 21, wherein the analyzing flicker components completes a discrete Fourier transformation on a first dimension based on a sum of pixel values on each line.

23. An image picking-up apparatus comprising:
an image sensing element picking up an image by a shutter operation for each line;
a flicker detection apparatus using an exposure method of a focal plane system for taking in a first image using a first shutter time which is a shortest time for no flicker to occur and a second image using a second shutter time which is shorter than the shortest time for no flicker to occur, and judging an occurrence of flickers based on a variation of flicker components extracted from the first and second images having different shutter times; and
a shutter-time controller controlling a shutter time of the image sensing element based on a result of judging the occurrence of flicker.

24. An image picking-up apparatus according to claim 23, further comprising a shutter-timing controller setting shutter timing to be an integral multiplication of a flickering period when the occurrence of flicker is detected by the flicker detecting device.

* * * * *